June 2, 1959 — E. PRETE, JR — 2,889,136
STRAP FASTENING AND TENSIONING DEVICE
Filed Sept. 26, 1955 — 2 Sheets-Sheet 1

ERNEST PRETE, JR.
INVENTOR.

BY
Attorney

June 2, 1959     E. PRETE, JR     2,889,136
STRAP FASTENING AND TENSIONING DEVICE
Filed Sept. 26, 1955     2 Sheets-Sheet 2
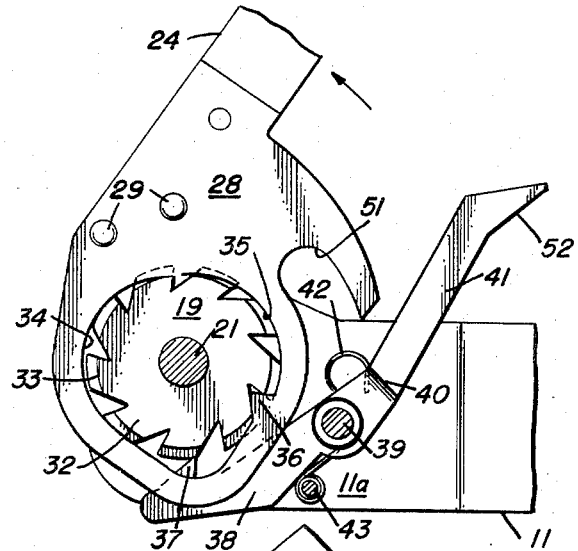
*Fig. 4.*
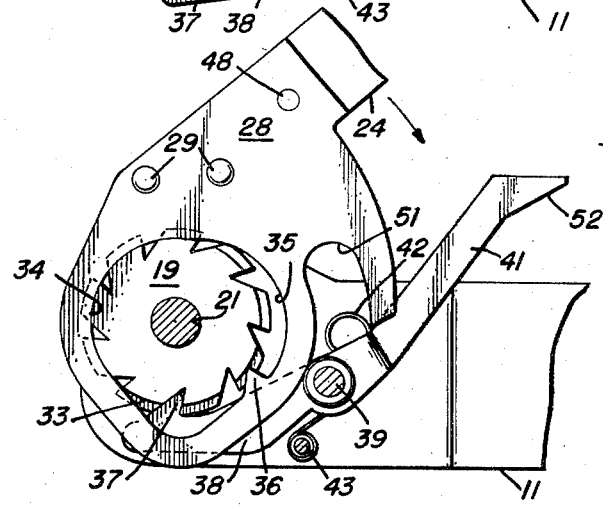
*Fig. 5.*
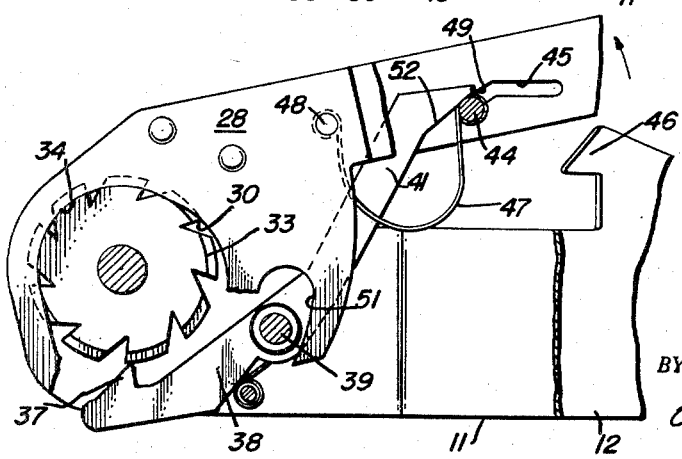
*Fig. 6.*
ERNEST PRETE, JR.
INVENTOR.
BY 
Attorney

United States Patent Office 2,889,136
Patented June 2, 1959

2,889,136

STRAP FASTENING AND TENSIONING DEVICE

Ernest Prete, Jr., Los Angeles, Calif., assignor, by mesne assignments, to Gordon D. Brown, Beverly Hills, Calif.

Application September 26, 1955, Serial No. 536,625

7 Claims. (Cl. 254—164)

The present invention relates generally to fastening devices, and is more particularly concerned with a strap fastening and tensioning device.

Conventional constructions incorporated in devices for the herein described purpose have been largely unsatisfactory as provision was made only for shortening the strap by a fixed amount, thus limiting the tensioning stresses which could be applied to the strap. Such arrangements were particularly unsuited for straps of considerable length.

With the inherent disadvantages of conventional devices in mind, and their unsuitability for varied installation requirements, and use under widely varying conditions; the present invention contemplates a strap fastening and tensioning device of unique construction having a high degree of flexibility; and which may be easily operated to control the strap tension under varied conditions, as desired.

A further object is to provide a hand operated ratchet type tensioning device having a high order of mechanical advantage, which eliminates the necessity for spring biased ratchet elements, and which has a mechanism arranged to simultaneously release the ratchet and holding pawls so as to release the strap tension.

It is also an object to provide a manually operable strap tensioning device having a hook member, and which incorporates a built-in actuating lever for manipulating a strap take-up mechanism, the lever being latchable during non-use in a position wherein it serves as a keeper for the hook member.

Briefly these objects are accomplished by utilizing a construction which comprises an elongate framework adapted at one end to receive a flexible strap, and at an opposite end having attaching means for anchoring the framework. Operatively mounted in the framework is a takeup mechanism including a strap winding reel having a ratchet wheel. For operation of the ratchet wheel, there is provided a lever which is hand operated and which is formed at one end to provide a wheel spanner and an associated ratchet tooth which may be actuated into engagement with and disengaged from the teeth of the ratchet wheel by opposite swinging movements of the operating lever, and which does not necessitate the use of pawl ratchet springs. The invention further includes a mechanism for tripping or releasing the strap winding reel so that the tension may be relieved, when desired, this tripping mechanism being controlled by a selectively movable member carried by the actuating lever or handle.

Further objects of the invention will be brought out in the following part of the specification, wherein detailed description is for the purpose of fully disclosing the invention without placing limitations thereon.

Referring to the accompanying drawings, which are for illustrative purposes only:

Fig. 4 is an enlarged fragmentary view of the ratchet mechanism, showing the cooperative relationship of the parts during movement of the actuating lever in a reel winding direction;

Fig. 5 is a similar view showing the coaction of the parts of the ratchet mechanism, during movement of the handle lever in a reverse direction, a holding pawl retaining the ratchet wheel against reverse movement; and Fig. 6 is a similar view showing the operation of the mechanism for releasing the ratchet mechanism to permit unwinding of the strap reel to release strap tension.

Figure 1:
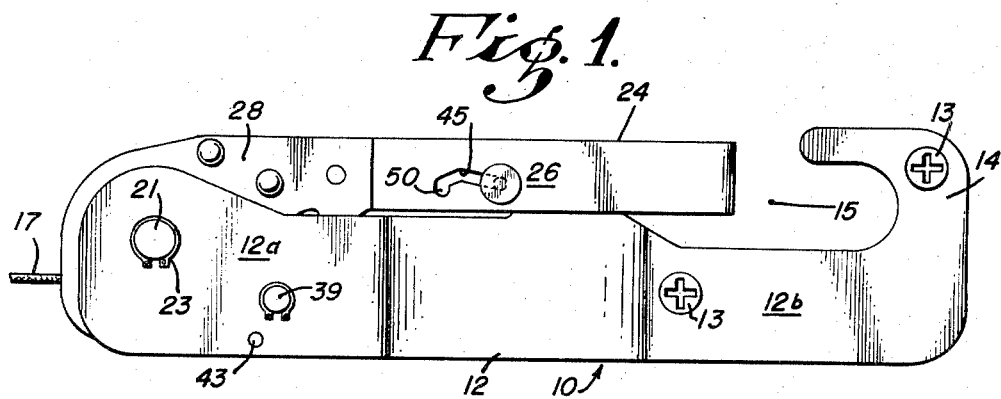
Fig. 1 is a side elevational view of a strap fastening and tensioning device incorporating the features of the invention.
Figure 2:
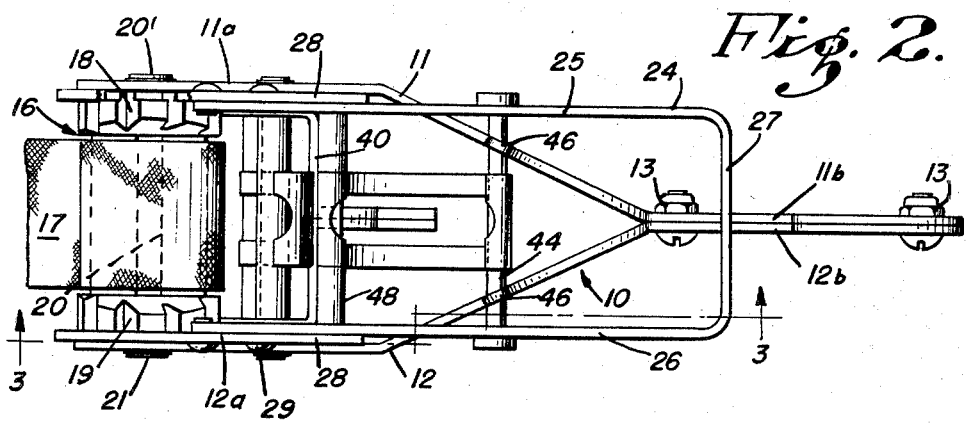
Fig. 2 is a plan view of the same.

Referring generally to the drawings, for illustrative purposes, the invention is shown in Figs. 1 and 2 as comprising generally a Y-shaped frame structure 10 in which elongate side members 11 and 12 are deformed so as to have parallel spaced apart end portions 11a and 12a at one end of the frame structure, while the other ends of the side members 11b and 12b are secured together in face engagement by means of bolts 13. At this end of the frame structure, the end portions 11b and 12b are deflected to form a hook 14 having an entrance opening as generally indicated at 15. This hook provides fastening means by which the frame structure may be anchored.

At the opposite end of the frame structure 10, there is rotatably mounted a winding reel 16 for a flexible strap 17. This reel comprises toothed ratchet wheels 18 and 19 which are interconnected by diametrically spaced rods 20'—20' which are adapted to have an end of the strap 17 inserted therebetween so that upon rotation of the reel these rods will clampingly engage the strap and cause it to be wound up on the reel, when the reel is rotated. In order to enable rotation of the reel, the ratchet wheels 18 and 19, which form the reel ends, are respectively provided at their centers with axially outwardly projecting trunnions 20 and 21 which extend through appropriate openings in the side members 11a and 12a, the trunnions being retained against removal by snap rings 23 seated in a circumferentially extending groove in the trunnion.

Figure 3:
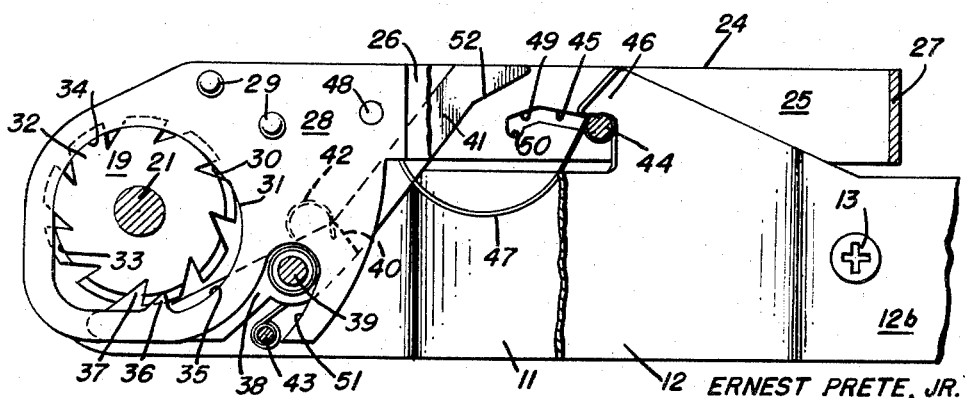
Fig. 3 is an enlarged fragmentary side elevational view with parts cut away to disclose the cooperative relationship between certain elements of the device.

A ratchet wheel advancing mechanism is provided for motivating the winding reel. For such purpose, there is provided an operating handle in the form of a U-shaped member 24 having parallel legs 25 and 26 which are interconnected by a bridging portion 27. The legs 25 and 26 are each provided with an end plate 28 secured to the leg by conventional means, in this case as by rivets 29. As best shown in Fig. 3, the end plates 28 form in effect a floating pivot for this end of the handle member which permits swinging movements thereof about the axis of rotation of the winding reel.

The plate 28 is formed with an elongate opening 30 therein, this opening being defined by an edge wall 31 of the plate. As shown, the ratchet wheel is in each case provided with inclined teeth 32 around its periphery, which are cut back on their ends to form arcuate shoulders 33 at the ends of the winding reel, these shoulders at each end cooperating to form circumferentially extending shoulder means against which curved portions 34 and 35 of the wall 31 are adapted to abut during swinging movements of the handle member 24. Associated with the wall portion 35 is a projection 36 forming a tooth or pawl which is normally adapted at its end to ride on the shoulder forming means, when the handle 24 is in inactive position, as shown in Fig. 3, with the curved portion 34 in engagement with the shoulder forming means. However, when the handle member 24 is swung in a counterclockwise direction, the tooth 36 will coact with the teeth of the ratchet wheel at each end of the strap reel to motivate the reel in a strap winding direction, as will hereinafter be explained more fully.

Reverse rotation of the winding reel is prevented by a pawl member 37 associated with each of the ratchet wheels. Each pawl 37 is carried at the outermost end of an arm 38 which is pivoted upon a pin 39, the arms 38—38 at the respective sides of the frame structure being interconnected through a bridging portion 40 which is provided with a central projecting tripping lever 41. The pawl member 37 is normally biased to a position of engagement with the ratchet wheel teeth by means of a leaf spring 42 which is anchored at one end on a fixed pin 43 secured to the frame structure, and has its other end engaged under the bridging portion 40.

The handle member 24 is arranged to normally occupy a position as shown in Fig. 3, in which it extends substantially parallel to the frame structure 10, and in this position it will be observed that the free end of the handle structure extends into the entrance opening 15 of the hook 14 so as to form a keeper. The handle member 24 is arranged to be releasably latched in the normal position by means of a detent bar 44, the ends of this bar respectively being laterally slidable in a guide slot 45 in each case. In latching position, the bar 44 is positioned under projections 46 respectively formed on the upper edge margins of the side members 11 and 12. The bar 44 is biased towards the latching position by means of a bowed spring 47, one end of this spring being anchored to a spacer pin 48 connected between the legs 25 and 26, and the other end of the spring being secured to the bar. The bar may be moved and retained in a nonlatching position by movement into an angularly extending end portion 49 of the slot 45, this end portion terminating in a dwell notch 50.

Referring now to Fig. 4, the operation of the ratchet mechanism will now be more specifically described. With the detent bar 44 moved to unlatched position, the handle member 24 may now be manually grasped and swung away from the frame structure 10 in a counterclockwise direction as shown in Fig. 4. This movement of the handle carries the projection 36 to a position where it may move into a notch behind one of the teeth 32 of the associated ratchet wheel, whereupon further movement of the handle member will rotate the winding reel in a direction to take up the slack in the strap 17 and apply tension thereto. During this movement, the teeth will force the pawl 37 outwardly with a cam action so that the winding reel is free to move in a winding direction. However, when the direction of movement of the handle member 24 is reversed and moved in a clockwise direction as shown in Fig. 5, the pawl 37 will engage behind one of the ratchet wheel teeth and oppose reverse movement of the winding reel. Relative movement of the projection 36 with respect to the associated ratchet wheel will cause the projection to move out of its position behind one of the ratchet wheel teeth and ride along the shoulder forming means to a new position of engagement with the ratchet wheel teeth which will occur when the handle is again moved in a counterclockwise direction.

It will be observed that the use of an elongate opening 30 permits the curved edge portion 35 of the wall 31 to move towards the adjacent shoulder forming means sufficiently to let the projection 36 engage behind a ratchet tooth during winding movement of the handle 24. During reverse movement of the handle, as shown in Fig. 5, the curved wall portion 34 will be moved into engagement with the adjacent portion of the shoulder forming means, thus enabling sufficient movement to carry the projection 36 out of engagement with the ratchet wheel teeth. It will be observed that the construction described above forms in effect a spanner arrangement in connection with the ratchet wheels, and that controlling forces for moving the projection into engaged and disengaged relationship with the teeth of the ratchet wheels will be dependent upon the direction of movement of the handle member 24. This operation thus takes place automatically and eliminates the use of a spring pawl for this purpose.

With a tensioning device of this character, it must be possible to release the winding reel in order to relieve tension on the strap, when desired. In the present invention this is accomplished by a tripping mechanism which will now be described. For releasing the winding reel, the detent bar 44 is moved into the dwell notch 50, as shown in Fig. 6. The handle is thus unlatched and may be swung in a counterclockwise direction through an initial movement which will carry the detent bar 44 into engagement with the outermost end of the tripping lever 41. By slight pressure of the bar 44 thereagainst, the pawl member 37 is disengaged from the teeth of the ratchet wheel. In order to prevent movement of the projection 36 into a tooth engaging position during this initial movement of the handle member 24 to release the winding reel, an arcuate slot 51 is formed in each plate 28 which has the pin 39 positioned therein during this initial tripping movement, thus acting to restrain movement of the plate 28 in a direction which would permit movement of the projection 36 into a tooth engaging position during this initial movement of the handle 24. However, once the handle 24 is moved beyond this initial tripping position, the pin 39 is no longer positioned within the slot 51, and under such circumstances the projection 36 will operate in a normal ratching manner. The outer end of tripping lever 41 is provided with a camming edge 52 which is positioned at an angle which will automatically force the detent bar out of the dwell notch 50 when a predetermined pressure is applied to the handle 24.

Various modifications may suggest themselves to those skilled in the art without departing from the spirit of my invention, and, hence, I do not wish to be restricted to the specific form shown or uses mentioned except to the extent indicated in the appended claims.

I claim:

1. A strap tensioning device, comprising: a frame structure; a strap winding reel rotatably supported on said frame structure; a toothed ratchet wheel operable to rotate said reel; a lever structure supported adjacent one end for swinging movements in opposite directions about the axis of said wheel, said one end defining a wheel spanner having a projection adapted to engage a tooth of said wheel when the lever is swung in one direction, and disengage said tooth when the lever is swung in opposite direction; a pawl opposing movement of said reel in a strap unwinding direction; means for releasably latching said lever and frame structure against relative movements including a member carried by said lever and supported for movement to latching and unlatching positions; and means operative, during initial swinging movement of said lever away from a latched association with said frame, for releasing said pawl and said projection with respect to the teeth of said wheel, including a tripping element engageable by said member, when said member is disposed in its non-latching position during such initial swinging movement.

2. A strap tensioning device, comprising: a frame structure; a strap winding reel rotatably supported on said frame structure; a toothed ratchet wheel operable to rotate said reel; a lever structure supported adjacent one end for swinging movements in opposite directions about the axis of said wheel, said one end defining a wheel spanner having a projection adapted to engage a tooth of said wheel when the lever is swung in one direction, and disengage said tooth when the lever is swung in an opposite direction; a pawl opposing movement of said reel in a strap unwinding direction; means for releasably latching said lever and frame structure against relative movements including a member carried by said lever and supported for movement to latching and non-latching positions; means operative, during initial swinging movement of said lever away from a latched association with said frame, for releasing said pawl and said projection with respect to the teeth of said wheel, including a tripping element engageable by said member, when said member is disposed in its non-latching position during such initial swinging movement; and a cam associated with said element for moving said member from its non-latching position, when the pressure of engagement between said member and element reach a predetermined value.

3. A strap tensioning device, comprising: a frame structure; a strap winding reel rotatably supported on said frame structure; a toothed ratchet wheel operable to rotate said reel, said teeth each having an arcuate shoulder, said shoulders extending concentrically of the reel axis; a lever structure supported adjacent one end for swinging movements in opposite directions about the axis of said wheel, said one end having a wall defining an elongate opening therein, said wall on one side of said wheel axis being adapted to engage the shoulders on one side when the lever is swung in one direction, and the wall on the opposite side of said axis being engageable with other of the shoulders when the lever is swung in an opposite direction; and a projection carried by said lever engaged and disengaged with respect to a ratchet wheel tooth by the respective movements of said lever in one direction and in an opposite direction.

4. A strap fastening and tensioning device, comprising: a frame structure including a hook at one end; strap tensioning means at an opposite end of said frame including an actuating lever supported for oscillatory swinging movement, said lever having a normal inactive position with respect to said frame in which said lever forms a keeper for said hook.

5. A strap fastening and tensioning device, comprising: a frame structure; a strap winding mechanism including a toothed ratchet wheel rotatably supported on said frame structure; a lever structure supported adjacent one end for swinging movements in opposite directions about the axis of said wheel, said one end defining a wheel spanner radially shiftable of said wheel and having an integrally formed fixed projection adapted to engage a tooth of said wheel upon shifting of said spanner in one direction when the lever is swung in a reel winding direction, and disengage said tooth upon shifting of said spanner in another direction when the lever is swung in an opposite direction; a pawl opposing unwinding movement of said reel; means selectively operable to simultaneously release said projection and said pawl with respect to said wheel teeth in response to a predetermined initial movement of said lever in a winding direction; and means for positively restraining movement of said projection into engagement with said wheel teeth during said initial lever movement.

6. A strap tensioning device, comprising: a frame structure; a strap winding reel rotatably supported on said frame structure; a toothed ratchet wheel operable to rotate said wheel, said teeth each having an arcuate shoulder, said shoulders extending concentrically of the reel axis; a lever structure supported adjacent one end for swinging movements in opposite directions about the axis of said wheel and normally lying along side said frame structure, said one end having a wall defining an elongate opening therein, said wall on one side of said wheel axis being adapted to engage the shoulders on one side when the lever is swung in one direction, and the wall on the opposite side of said axis being engageable with other of the shoulders when the lever is swung in an opposite direction; a projection carried by said lever engaged and disengaged with respect to a ratchet wheel tooth by the respective movements of said lever in a direction away from its normal position and in an opposite direction; and means opposing engagement of said projection with teeth of said ratchet wheel during a predetermined initial movement of said lever in said direction away from its normal position.

7. A strap tensioning device, comprising: a frame structure; a strap winding reel rotatably supported on said frame structure; a toothed ratchet wheel operable to rotate said wheel, said teeth each having an arcuate shoulder, said shoulders extending concentrically of the reel axis; a lever structure supported adjacent one end for swinging movements in opposite directions about the axis of said wheel and normally lying along side said frame structure, said one end having a wall defining an elongate opening therein, said wall on one side of said wheel axis being adapted to engage the shoulders on one side when the lever is swung in one direction, and the wall on the opposite side of said axis being engageable with other of the shoulders when the lever is swung in an opposite direction; a projection carried by said lever engaged and disengaged with respect to a ratchet wheel tooth by the respective movements of said lever in one direction away from its normal position and in an opposite direction; a pawl engaging said ratchet wheel teeth to hold said reel against reverse movement when said projection is disengaged; means opposing engagement of said projection with teeth of said ratchet wheel during a predetermined initial movement of said lever in said direction away from its normal position; and selective means responsive to the initial movement of said lever for releasing said pawl, whereby said reel is free for reversed movement.

References Cited in the file of this patent
UNITED STATES PATENTS

| | | |
|---|---|---|
| 326,876 | Kramer et al. | Sept. 22, 1885 |
| 380,995 | Crandall | Apr. 10, 1888 |
| 734,388 | Workman | July 21, 1903 |
| 889,879 | Harris | June 2, 1908 |
| 1,236,616 | Snow | Aug. 14, 1917 |
| 1,813,447 | Haubert | July 7, 1931 |